(12) United States Patent
Suzuki

(10) Patent No.: US 9,435,380 B2
(45) Date of Patent: Sep. 6, 2016

(54) BEARING DEVICE

(71) Applicant: JTEKT CORPORATION, Osaka-shi, Osaka (JP)

(72) Inventor: Akiyuki Suzuki, Osaka (JP)

(73) Assignee: JTEKT CORPORATION, Osaka (JP)

( * ) Notice: Subject to any disclaimer, the term of this patent is extended or adjusted under 35 U.S.C. 154(b) by 0 days.

(21) Appl. No.: 14/434,119

(22) PCT Filed: Oct. 11, 2013

(86) PCT No.: PCT/JP2013/077690
§ 371 (c)(1),
(2) Date: Apr. 8, 2015

(87) PCT Pub. No.: WO2014/058038
PCT Pub. Date: Apr. 17, 2014

(65) Prior Publication Data
US 2015/0267754 A1 Sep. 24, 2015

(30) Foreign Application Priority Data

Oct. 12, 2012 (JP) ................................. 2012-226534
Dec. 17, 2012 (JP) ................................. 2012-274303

(51) Int. Cl.
*F16C 43/04* (2006.01)
*F16C 35/063* (2006.01)
(Continued)

(52) U.S. Cl.
CPC ......... *F16C 35/0635* (2013.01); *F16C 33/586* (2013.01); *F16C 35/063* (2013.01); *F16C 35/067* (2013.01); *F16C 19/364* (2013.01); *F16C 2226/12* (2013.01); *F16C 2240/42* (2013.01)

(58) Field of Classification Search
CPC . F16C 35/063; F16C 35/0635; F16C 35/067
USPC ............ 384/537, 544, 585, 589; 29/898.07; 459/359.1, 359.6; 403/359.1, 359.6
See application file for complete search history.

(56) References Cited

U.S. PATENT DOCUMENTS 3,066,000 A * 11/1962 Howell ............... F16C 35/0635
384/537
3,405,982 A * 10/1968 Krenn ..................... F16C 33/08
384/537

(Continued)

FOREIGN PATENT DOCUMENTS

DE 2025591 A1 * 12/1970 ............. F01D 25/16
EP 2177777 A1 4/2010

(Continued)

OTHER PUBLICATIONS

Jun. 8, 2016 Extended European Search Report issued in European Patent Application No. 13846011.8.
Jun. 21, 2016 Office Action issued in Japanese Patent Application No. 2012-226534.

*Primary Examiner* — Phillip A Johnson
(74) *Attorney, Agent, or Firm* — Oliff PLC

(57) ABSTRACT

An inner ring has a plurality of grooves which are formed on its inner peripheral face and extended from an end thereof in an axial direction. The grooves are extended from both ends in the axial direction of the inner ring inwardly in the axial direction, and closed in a middle part in the axial direction of the inner peripheral face of the inner ring. The grooves are formed in plurality at an equal interval in a circumferential direction.

7 Claims, 9 Drawing Sheets

(51) Int. Cl.
*F16C 35/067* (2006.01)
*F16C 33/58* (2006.01)
*F16C 19/36* (2006.01)

(56) References Cited

U.S. PATENT DOCUMENTS

| | | |
|---|---|---|
| 5,058,262 A | 10/1991 | Brockmuller et al. |
| 6,497,515 B1 | 12/2002 | Sahashi et al. |
| 8,382,378 B2 * | 2/2013 | Fukumura ........... B60B 27/0005 384/544 |
| 8,393,798 B2 * | 3/2013 | Nakagawa ............ B60B 27/005 384/544 |

FOREIGN PATENT DOCUMENTS

| | | |
|---|---|---|
| FR | 2940379 A1 | 6/2010 |
| JP | 3006563 U | 1/1995 |
| JP | 2001-001710 A | 1/2001 |
| JP | 2003-130062 A | 5/2003 |
| JP | 2005-133868 A | 5/2005 |
| JP | 2007-078137 A | 3/2007 |
| JP | 2009-041644 A | 2/2009 |
| JP | 2009-083699 A | 4/2009 |
| JP | 2010-132264 A | 6/2010 |

BEARING DEVICE

TECHNICAL FIELD

The present invention relates to a bearing device, and more particularly, to the bearing device which is prevented from occurrence of a creep, in case where an outer ring or an inner ring is inappropriately fitted.

BACKGROUND ART

A bearing device which is provided with an inner ring, an outer ring, and rolling elements arranged between the inner ring and the outer ring, and in which the inner ring is assembled to a shaft or the outer ring is assembled to a housing by fitting has been well known. In the bearing device of this type, a so-called creep, that is, a phenomenon that relative rotation occurs between the shaft and the inner ring or between the housing and the outer ring, in case of a large load or inappropriate fitting, may happen in some cases. When the creep has happened, abrasion occurs and backlash is increased, and there is arisen such a problem that the shaft is unable to be held. In view of the above, bearing devices having enhanced creep resistance have been proposed (Patent Documents 1, 2 and 3).

Patent Document 1 discloses that a circumferential groove which is not in contact with the shaft or the housing is formed in a center part of the inner ring or the outer ring. Moreover, Patent Document 2 discloses that the inner ring is provided with concave grooves in an axial direction, and the relative rotation between the inner ring and the hub wheel is prevented, by thrusting an end portion of a hub wheel into the concave grooves by rolling caulking or so, and further, by caulking the end portion of the hub wheel.

Patent Document 3 discloses that the hub wheel and the inner ring are respectively provided with concavo-convex parts, and these concavo-convex parts are fitted to each other thereby to prevent the relative rotation between the inner ring and the hub wheel.

PRIOR ART DOCUMENT

Patent Document

Patent Document 1: JP-A-2007-78137
Patent Document 2: JP-A-2001-1710
Patent Document 3: JP-A-2010-132264

SUMMARY OF THE INVENTION

Problems that the Invention is to Solve

Out of the conventional measures for enhancing the creep resistance as described above, the measure in Patent Document 1 has such a problem that rigidity is lowered due to presence of the circumferential grooves, and hence, the creep is likely to occur in case where a clamping margin is small. Moreover, the measure in Patent Document 2 has such a problem that it is necessary to thrust the end portion of the hub wheel into the concave grooves by rolling caulking or so, which increases the number of steps in assembling.

The conventional measure for enhancing the creep resistance as disclosed in the above described Patent Document 3 has such a problem that it is necessary to engage the concavo-convex parts with each other by caulking the end portion of the hub wheel, which increases the number of steps in assembling.

An object of this invention is to provide a bearing device in which creep resistance is enhanced without increasing the number of steps in assembling.

Means for Solving the Problems

According to the invention, there is provided a bearing device including: an inner ring; an outer ring; and rolling elements which are arranged between the inner ring and the outer ring, wherein the inner ring is assembled to an inside member by fitting, or the outer ring is assembled to an outside member by fitting, characterized in that one of a fitting face of the inner ring which is fitted to the inside member, a fitting face of the inside member which is fitted to the inner ring, a fitting face of the outer ring which is fitted to the outside member, and a fitting face of the outside member which is fitted to the outer ring is formed with a plurality of grooves which are extended inwardly in an axial direction from an end of the fitting face and which are arranged in a circumferential direction.

It is preferable that the grooves are extended from both ends in an axial direction of the fitting face and closed in a middle part in the axial direction of the fitting face. By extending the grooves from the both ends in the axial direction of the fitting face, it is possible to make a total length of the grooves longer. Moreover, by closing the grooves in the middle part in the axial direction of the fitting face, it is possible to secure a smooth cylindrical face (a cylindrical face having no groove) which functions as a reference face in managing a circumferential length of the fitting face.

It is preferable that the grooves have a trapezoidal shape in cross section. With this shape, local deformation of edges of the grooves is likely to occur at a time of fitting, and more rigid fitting can be obtained by a stress which occurs with this deformation.

It is preferable that the grooves are extended in a direction inclined with respect to the axial direction. In this manner, the edges of the grooves are made longer, as compared with the grooves extending in parallel with the axial direction, in case where the grooves are closed at the same position. Accordingly, it is advantageous that a region subjected to an edge stress can be made longer.

According to the invention, there is also provided a bearing device including: a rolling bearing that includes: an outer ring; an inner ring; and rolling elements which are arranged between the rings; and a press-fitted member to which a raceway ring that is one of the outer ring and the inner ring is fitted by press-fitting, the press-fitted member having: a press-fitted face to which the raceway ring is press-fitted; a positioning face in a step-like shape for regulating an axial position of the raceway ring; and a corner part of the press-fitted member which is formed between the press-fitted face and the positioning face, the raceway ring having: a press-fitting face which is press-fitted to the press-fitted face of the press-fitted member; a butting face which is butted against the positioning face of the press-fitted member; and a corner part of the raceway ring which is formed between the press-fitting face and the butting face, characterized in that the corner part of the press-fitted member and the corner part of the raceway ring respectively have an opposed face of the press-fitted member and an opposed face of the raceway ring which are opposed to the other corner part with a clearance between them, and one of the opposed face of the press-fitted member and the opposed face of the raceway ring is provided with a plurality of convex parts biting into the other opposed face, in a circumferential direction.

Usually, the creep is prevented only by a clamping margin between the press-fitting face of the raceway ring and the press-fitted face of the press-fitted member. The corner part of the raceway ring which is formed between the press-fitting face and the butting face of the raceway ring is opposed to the corner part of the press-fitted member which is formed between the press-fitted face and the positioning face of the press-fitted member, with a small clearance allowing a loose contact. On the other hand, in the bearing device according to the invention, the convex parts provided on either of the opposed face of the press-fitted member and the opposed face of the raceway ring bite into the other opposed face, and thus, the creep is prevented. When the convex parts bite into the other opposed face, the other opposed face is swelled. However, the swelled part can be absorbed by the clearance between the two opposed faces, and will not hinder press-fitting work. In this manner, it is possible to enhance the creep resistance without increasing the clamping margin. Assembling work can be performed by press-fitting in the same manner as in the prior art, and the number of steps in assembling will not be increased. Therefore, it is possible to enhance the creep resistance while depressing an increase of the cost to the least.

It is preferable that the convex parts are formed on one of the raceway ring and the press-fitted member which has higher hardness. In this manner, the convex parts more easily bite into the other opposed face, and hence, more rigid fitting between the raceway ring and the press-fitted member is obtained. As the results, it is possible to more remarkably enhance the creep resistance.

It is preferable that the convex parts are formed on the raceway ring, the corner part of the press-fitted member is formed in a curved shape, the corner part of the raceway ring is chamfered, and the opposed face of the raceway ring is formed as an inclined face with respect to the press-fitting face and the butting face, and an angle formed between the inclined face and the press-fitting face is set to be smaller than an angle formed between a face formed by being chamfered and the press-fitting face. In this manner, it is possible to more easily conduct the press-fitting work.

It is preferable that respective tip ends of the convex parts are pointed. In this manner, the convex parts more easily bite into the press-fitted member, and hence, more rigid fitting between the raceway ring and the press-fitted member is obtained. As the results, it is possible to more remarkably enhance the creep resistance.

Advantage of the Invention

According to one aspect of the invention, one of the fitting face of the inner ring which is fitted to the inside member, the fitting face of the inside member which is fitted to the inner ring, the fitting face of the outer ring which is fitted to the outside member, and the fitting face of the outside member which is fitted to the outer ring is formed with a plurality of the grooves which are extended inwardly in the axial direction from the end of the fitting face and which are arranged in the circumferential direction. Therefore, the edges of the grooves are deformed, when the inner ring is assembled to the inside member or the outer ring is assembled to the outside member by press-fitting. As the results, the local deformation (the stress) occurs intermittently in the circumferential direction, and the creep resistance is enhanced. Assembling work can be performed by press-fitting in the same manner as in the prior art, and the number of steps in assembling will not be increased. Therefore, it is possible to enhance the creep resistance while depressing an increase of the cost to the least.

According to one aspect of the invention, the convex parts which are provided on one of the opposed face of the press-fitted member and the opposed face of the raceway ring bite into the other opposed face. In this manner, it is possible to enhance the creep resistance without increasing the clamping margin. The assembling work can be performed by press-fitting in the same manner as in the prior art, and the number of steps in assembling will not be increased. Therefore, it is possible to enhance the creep resistance while depressing an increase of the cost to the least.

MODE FOR CARRYING OUT THE INVENTION

Figure 1:
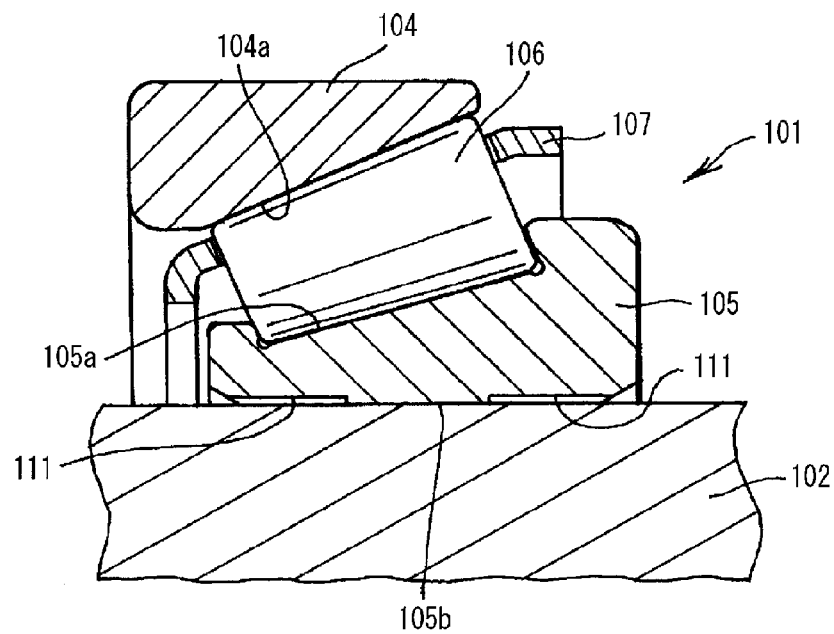
FIG. 1 is a longitudinal sectional view showing an upper half part of a bearing device in a first embodiment according to the invention.
Figure 2:
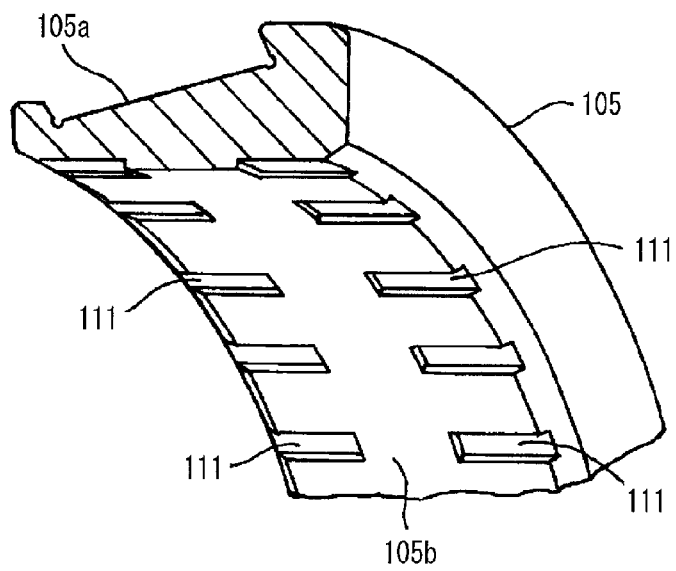
FIG. 2 is a perspective view showing an inner peripheral face of an inner ring which is an essential part in the first embodiment.

Embodiments of the invention will be described below, referring to the drawings.

FIG. 1 to FIG. 3(b) show a bearing device in a first embodiment according to the invention.

A bearing device 101 in this first embodiment includes an outer ring 104 having an outer ring raceway face 104a, an inner ring 105 having an inner ring raceway face 105a, a plurality of taper rollers 106 which are arranged between the two rings 104 and 105, a cage 107 for holding a plurality of the taper rollers 106, and a shaft (an inside member) 102 which is fitted to the inner ring 105.

In this first embodiment, a plurality of grooves 111 extending in an axial direction are formed on an inner peripheral face 105b of the inner ring 105 which is a fitting face to be fitted to the shaft 102. The grooves 111 are extended inwardly in the axial direction from both ends in the axial direction of the inner peripheral face 105b of the inner ring 105, and closed at positions in an intermediate part in the axial direction of the inner peripheral face 105b of the inner ring 105. An axial length of each of the grooves 111 is set to be about ⅓ (about ⅕ to ⅖), for example, of an axial length of the inner ring 105. In this manner, a smooth cylindrical face which is not provided with the grooves 111 remains in a center part of the inner ring 105, and it is possible to utilize this cylindrical face as a reference face in managing an inner peripheral length of the inner ring 105. Moreover, because the grooves 111 are extended from the both ends in the axial direction, it is possible to make a whole length of the grooves 111 long. The grooves 111 are formed at an equal interval in a circumferential direction.

Figure 3A:
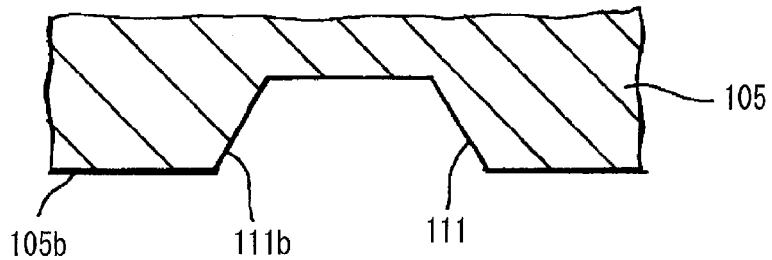
FIG. 3(a) and FIG. 3(b) are cross sectional views showing a shape of an edge of a groove at a time of press-fitting.
Figure 3B:
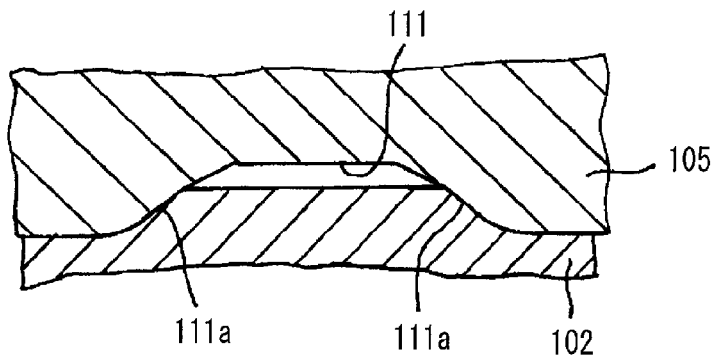

As shown in FIG. 3(a), each of the grooves 111 has a trapezoidal shape in cross section. By providing the grooves 111 having such a shape, edge parts 111a of the grooves 111 are locally deformed, as shown in FIG. 3(b), when the shaft 102 is press-fitted to the inner ring 105. Then, the shaft 102 and the inner ring 105 are rigidly fitted to each other by a stress which is formed following this deformation. Because the grooves 111 extending in the axial direction are formed at a plurality of positions, the local deformation (the stress) occurs intermittently in the circumferential direction. Therefore, it is possible to make particularly a creep, that is, a relative rotation between the shaft 102 and the inner ring 105 unlikely to occur (creep resistance is enhanced).

It is to be noted that in a cross sectional shape of the groove 111 as shown in FIGS. 3(a) and 3(b), an angle of the inclined face 111b with respect to an inner peripheral face of the inner ring 105 is preferably an obtuse angle. The cross sectional shape of the groove 111 is not limited to the trapezoidal shape but may be an arc shape, for example.

Figure 4:
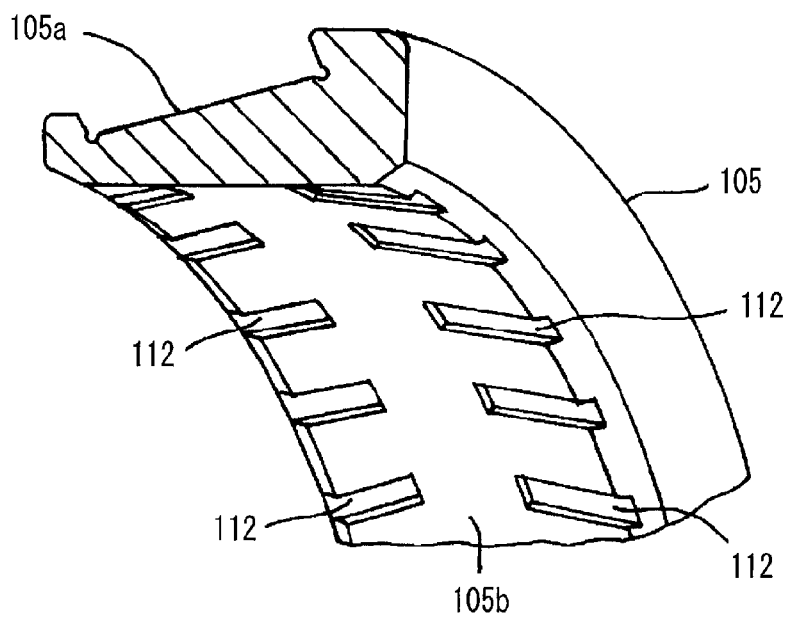
FIG. 4 is a perspective view showing an inner peripheral face of an inner ring which is an essential part of a bearing device in a second embodiment according to the invention.

The aforesaid grooves 111 are not necessarily provided in parallel with the axial direction, but grooves 112 which are extended in a direction inclined with respect to the axial direction, as shown in FIG. 4, may be formed, provided that they are formed so as to extend inwardly in the axial direction. According to this embodiment (a second embodiment), in case where each of the grooves 112 has the same axial length as the groove 111 in the first embodiment, an edge of the groove 112 is formed longer, as compared with that of the first embodiment, and hence, a part of the edge on which the stress is exerted can be advantageously made longer.

Figure 5:
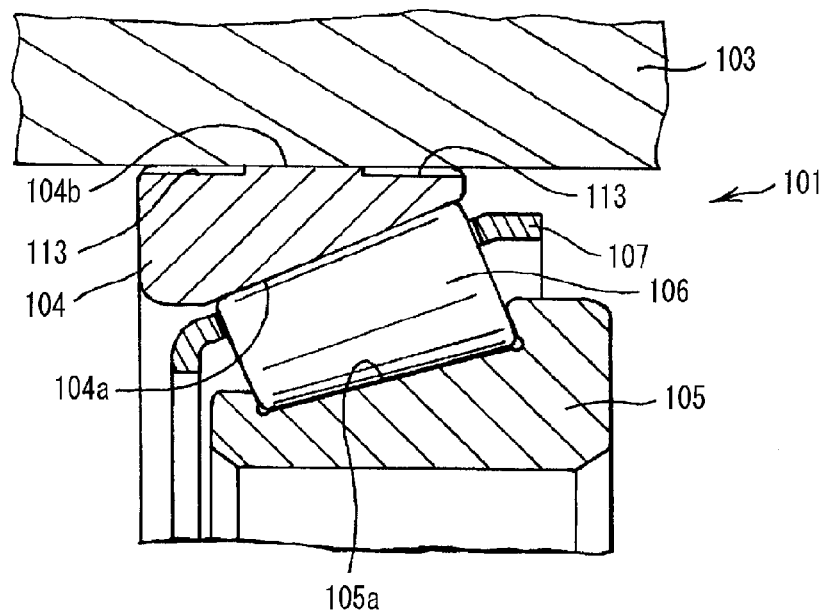
FIG. 5 is a longitudinal sectional view showing an upper half part of a bearing device in a third embodiment according to the invention.
Figure 6:
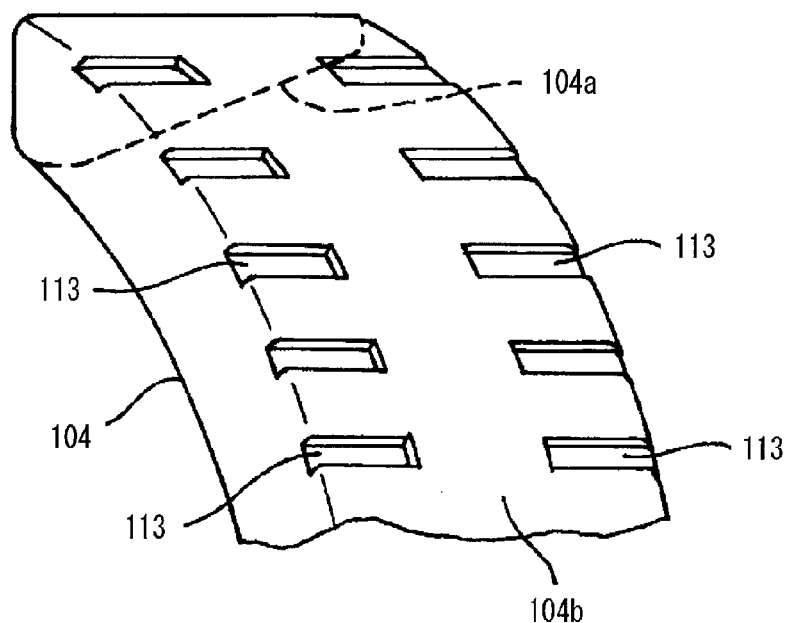
FIG. 6 is a perspective view showing an outer peripheral face of an outer ring which is an essential part in the third embodiment.

FIGS. 5 and 6 show a bearing device in a third embodiment according to the invention.

A bearing device 101 in this third embodiment includes an outer ring 104 having an outer ring raceway face 104a, an inner ring 105 having an inner ring raceway face 105a, a plurality of taper rollers 106 which are arranged between the two rings 104 and 105, a cage 107 for holding a plurality of the taper rollers 106, and a housing (an outside member) 103 to which the outer ring 104 is fitted.

In this third embodiment, a plurality of grooves 113 extending in the axial direction are formed on an outer peripheral face 104b of the outer ring 104 which is a fitting face to be fitted to the housing 103. The grooves 113 are extended inwardly in the axial direction from both ends in the axial direction of the outer peripheral face 104b of the outer ring 104, and closed at positions in an intermediate part in the axial direction of the outer peripheral face 104b of the outer ring 104. An axial length of each of the grooves 113 is set to be about ⅓ (about ⅕ to ⅖), for example, of an axial length of the outer ring 104. In this manner, a smooth cylindrical face which is not provided with the grooves 113 remains in a center part of the outer ring 104, and it is possible to utilize this cylindrical face as a reference face in managing an outer peripheral length of the outer ring 104. Moreover, because the grooves 113 are extended from the both ends in the axial direction, it is possible to make a whole length of the grooves 111 long. The grooves 113 are formed at an equal interval in a circumferential direction.

Each of the grooves 113 has a trapezoidal shape in cross section in the same manner as the groove which is shown in FIGS. 3(a) and 3(b). By providing the grooves 113 having such a shape, edge parts of the grooves 113 are locally deformed, when the outer ring 104 is press-fitted to the housing 103. Then, the outer ring 104 and the housing 103 are rigidly fitted to each other by a stress which is formed following this deformation. Because the grooves 113 are extended in the axial direction, the local deformation (the stress) occurs intermittently in the circumferential direction. Therefore, it is possible to make particularly a creep, that is, a relative rotation between the outer ring 104 and the housing 103 unlikely to occur (creep resistance is enhanced).

It is to be noted that in a cross sectional shape of the groove 113, an angle of an inclined face with respect to an outer peripheral face of the outer ring 104 is preferably an obtuse angle. The cross sectional shape of the groove 113 is not limited to the trapezoidal shape but may be an arc shape, for example.

Figure 7:
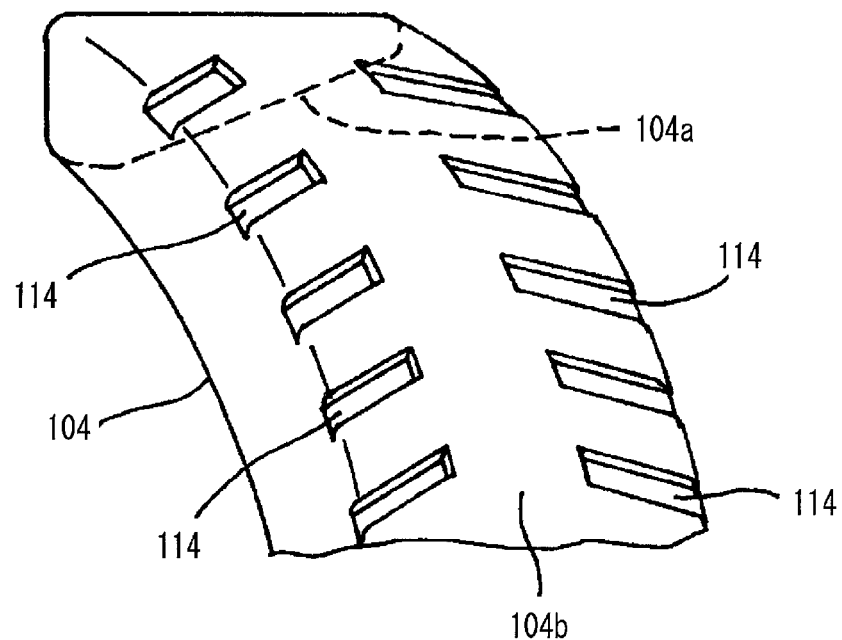
FIG. 7 is a perspective view showing an outer peripheral face of an outer ring which is an essential part of a bearing device in a fourth embodiment according to the invention.

The aforesaid grooves 113 are not necessarily provided in parallel with the axial direction, but grooves 114 which are extended in a direction inclined with respect to the axial direction may be formed, as shown in FIG. 7, provided that they are formed so as to extend inwardly in the axial direction. According to this embodiment (a fourth embodiment), in case where each of the grooves 114 has the same axial length as the groove in the third embodiment, an edge of the groove 114 is formed longer as compared with that of the third embodiment, and hence, a part of the edge on which the stress is exerted can be advantageously made longer.

The above described grooves 111, 112, 113, 114 can be formed by knurling work, for example. Depths of the grooves 111, 112, 113, 114 are set to be, for example, 40 to 100 μm, and widths of the grooves 111, 112, 113, 114 are set to be, for example, 0.1 to 2 mm. The number of the grooves 111, 112, 113, 114 is set to be at least three at one side. However, the number may be set to be several ten at one side. A process for forming the grooves 111, 112, 113, 114 is not limited to the knurling work.

Although not shown in the drawings, it is also possible to provide grooves on an outer peripheral face of the shaft 102 which is a fitting face to be fitted to the inner ring 105, instead of providing the grooves 111, 112 on the inner peripheral face 105b (the fitting face to be fitted to the shaft 102) of the inner ring 105. Moreover, it is also possible to provide grooves on an inner peripheral face of the housing 103 which is a fitting face to be fitted to the outer ring 104, instead of providing the grooves 113, 114 on the outer peripheral face 104b (the fitting face to be fitted to the housing 103) of the outer ring 104.

FIG. 8 to FIG. 10(c) show a bearing device in a fifth embodiment according to the invention.

Figure 8:
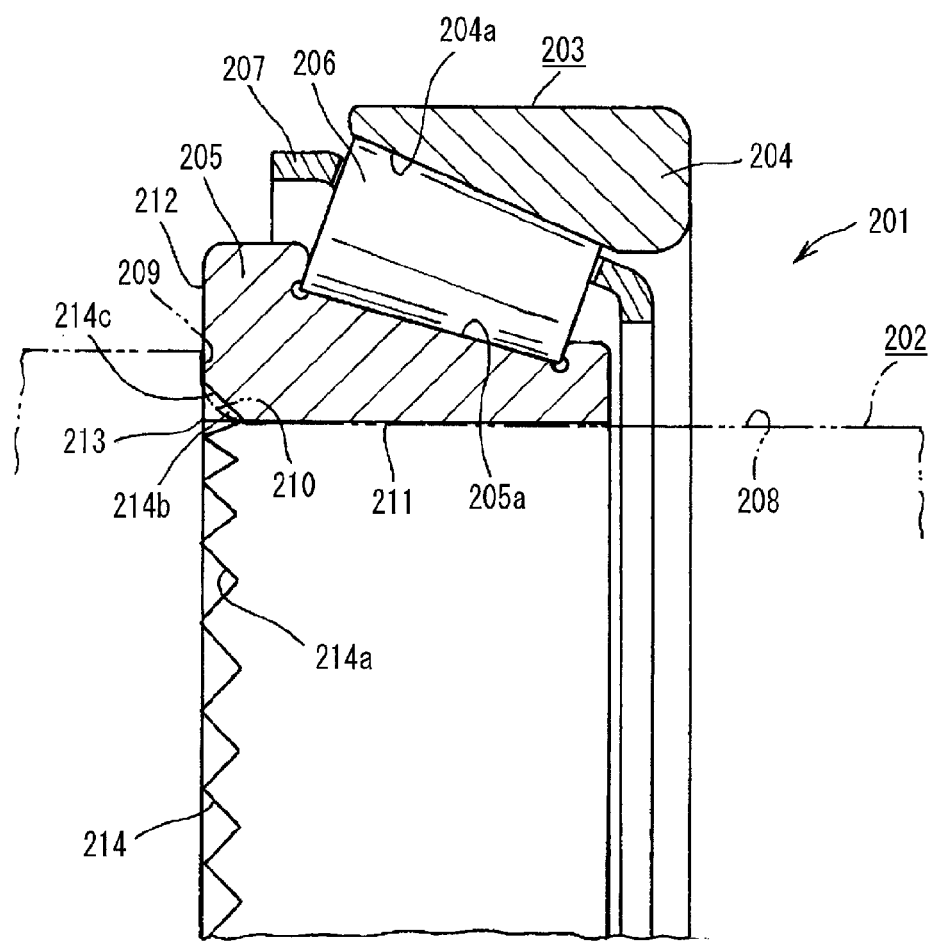
FIG. 8 is a longitudinal sectional view showing an upper half part of a bearing device in a fifth embodiment according to the invention.
Figure 9:
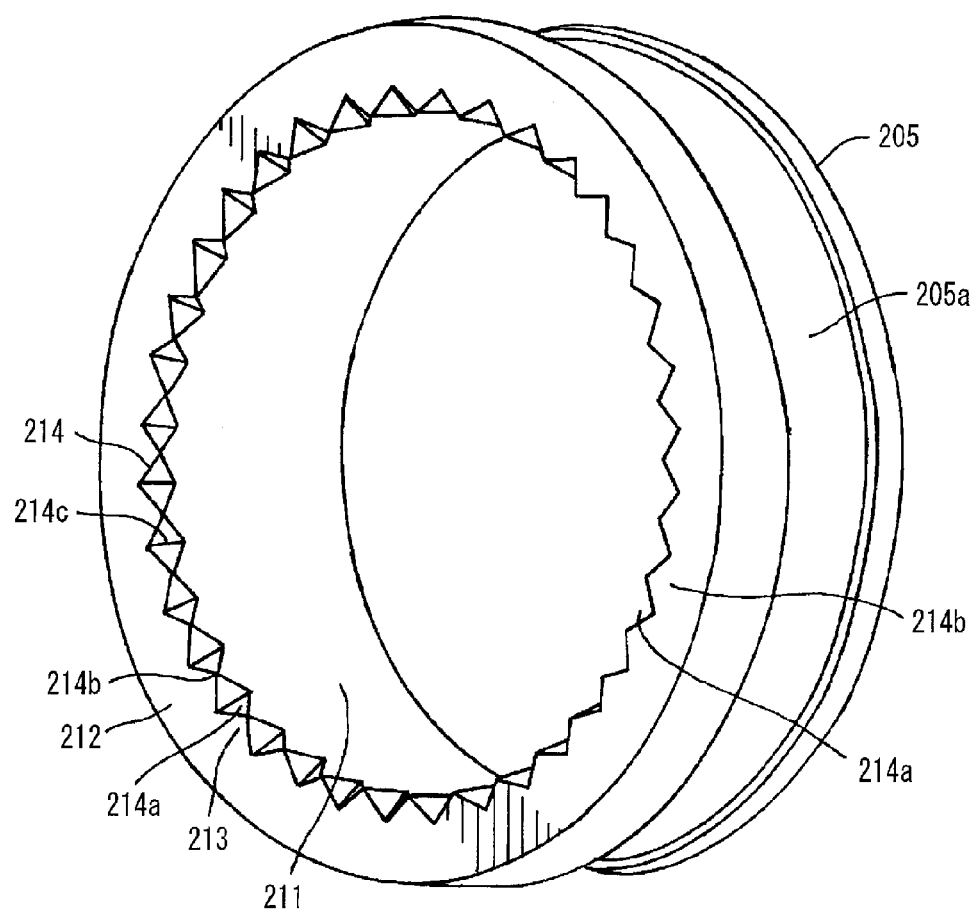
FIG. 9 is a perspective view showing a shape of an inner ring which is an essential part in the fifth embodiment.

As shown in FIG. 8, a rolling bearing 203 in this fifth embodiment includes an outer ring 204 having an outer ring raceway face 204a, an inner ring 205 having an inner ring raceway face 205a, a plurality of taper rollers (rolling elements) 206 which are arranged between the two rings 204 and 205, and a cage 207 for holding a plurality of the taper rollers 206. The inner ring 205 is press-fitted to a shaft 202 (a press-fitted member) thereby to form an essential part of the bearing device 201.

The shaft 202 has an outer peripheral face 208 which functions as a press-fitted face, a positioning face 209 in a step-like shape for regulating an axial position of the inner ring 205 which is press-fitted, and a corner part (a corner part of the press-fitted member) 210 which is formed between the outer peripheral face 208 and the positioning face 209. The positioning face 209 is formed by turning a part of the outer peripheral face 208 of the shaft 202. The corner part 210 of the shaft 202 is formed in a curved shape, because the positioning face 209 is formed by turning.

The inner ring (a raceway ring to be press-fitted) 205 of the rolling bearing 203 has an inner peripheral face (a press-fitting face) 211 which is press-fitted to the outer peripheral face (the press-fitted face) 208 of the shaft 202, an end face (a butting face) 212 which is butted against the positioning face 209 of the shaft 202, and a corner part (a corner part of the raceway ring) 213 which is formed between the inner peripheral face 211 and the end face 212.

The corner part 213 of the inner ring 205 is not chamfered, but the corner part 213 of the inner ring 205 is formed by intersection between the press-fitting face 211 and the end face 212. The corner part 213 of the inner ring 205 is provided with a concavo-convex part 214 which is formed by repeating, in a circumferential direction, concave parts 214a and convex parts 214b each having a triangular shape. The concavo-convex part 214 has a reference face 214c which is opposed to the corner part 210 of the shaft 202 with a clearance. The reference face 214c is a face which is continued in the circumferential direction, containing bottoms of the respective concave parts 214a. The reference face 214c is inclined with respect to either of the press-fitting face 211 and the end face 212. An angle of the reference face 214c with respect to the press-fitting face 211 and the end face 212 is 135° in either case. A part of the corner part 213 outward of the reference face 214c is cut away in a V-shape, as seen from a direction along the reference face 214c, thereby to form the concave part 214a, and the other part of the corner part 213 outward of the reference face 214c which remains after cut away is the convex part 214b. Because the corner part 213 of the inner ring 205 is not chamfered, a tip end of the convex part 214b has an angle of 90°. In this manner, the tip end of the convex part 214b is so shaped as to bite into the curve-shaped corner part 210 of the shaft 202.

Figure 10A:
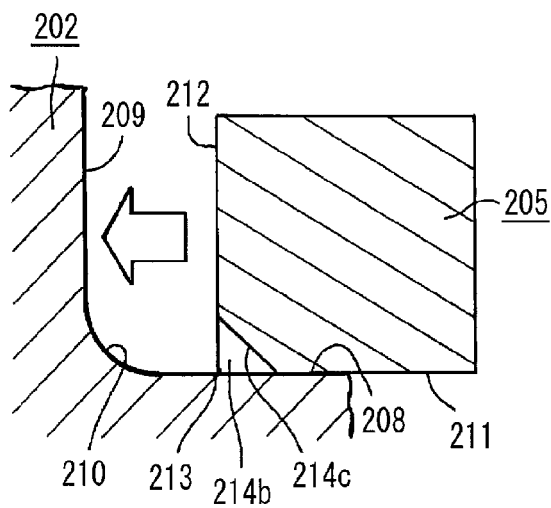
FIG. 10(a), FIG. 10(b) and FIG. 10(c) are longitudinal sectional views schematically showing press-fitting process between the shaft and the inner ring.
Figure 10B:
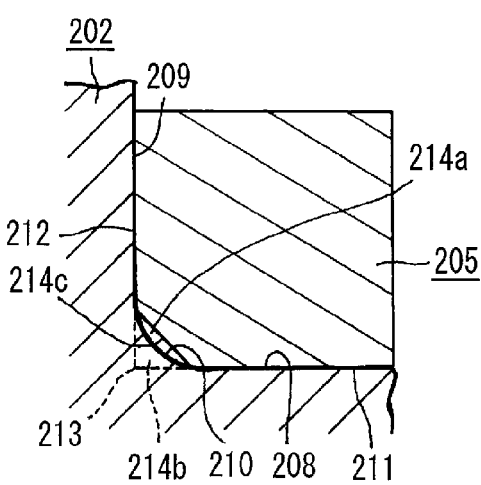
Figure 10C:
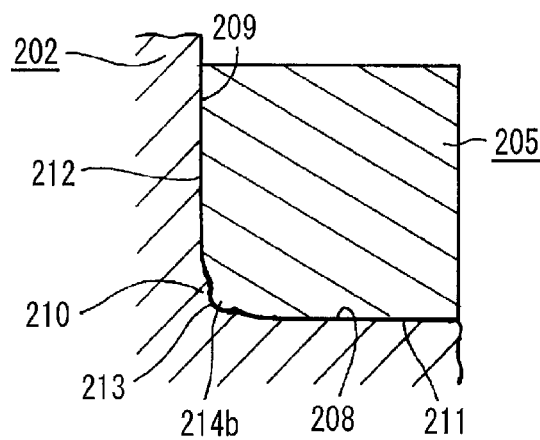

Specifically, as schematically shown in FIGS. 10(a), 10(b), and 10(c), when the inner peripheral face 211 of the inner ring 205 is being press-fitted to the outer peripheral face 208 of the shaft 202 (FIG. 10(a)), the curve-shaped corner part 210 of the shaft 202 interferes with the convex part 214b which is provided in the corner part 213 of the inner ring 205. By press-fitting the inner peripheral face 211, until the end face 212 of the inner ring 205 comes into contact with the positioning face 209 of the shaft 202 (FIG. 10(b)), the convex part 214b is slightly deformed, and starts to bite into the corner part 210 of the shaft 202 (FIG. 10(c)). As the results, the inner ring 205 and the shaft 202 are rigidly fitted to each other, and occurrence of a creep is prevented.

When the convex part 214b bites into the corner part 210 of the shaft 202, the corner part 210 of the shaft 202 is swelled. However, the swelled part is absorbed by the clearance (the concave part) 214a between the corner part 210 of the shaft 202 and the reference face 214c of the inner ring 205. Accordingly, even though the convex part 214b bites into the corner part 210 of the shaft 202, the press-fitting work will not be hindered.

In the conventional rolling bearing, the convex parts 214b are not provided, and the corner part 213 of the inner ring 205 and the corner part 210 of the shaft 210 are opposed to each other with a slight clearance. Moreover, the creep is prevented only by a clamping margin between the inner peripheral face 211 of the inner ring 205 and the outer peripheral face 208 of the shaft 202. For this reason, for the purpose of enhancing the creep resistance, it is necessary to increase the clamping margin. In this case, however, there is such anxiety that deformation of the inner ring 205 may occur.

According to the bearing device 201 in the fifth embodiment, because the convex parts 214b provided on the inner ring 205 bite into the corner part 210 of the shaft 202, the inner ring 205 is rigidly fitted to the shaft 202 without increasing the clamping margin. In this manner, it is possible to enhance the creep resistance without such anxiety that the inner ring 205 may be deformed. Assembling work can be performed by press-fitting in the same manner as in the prior art. Accordingly, additional working steps such as caulking are not required, and steps in assembling will not be increased. Therefore, it is possible to enhance the creep resistance while depressing an increase of the cost to the least.

In the fifth embodiment as described above, the shaft 202 is formed of carbon impregnated steel, for example, and both the outer ring 204 and the inner ring 205 are formed of bearing steel, for example. A height of the convex part 214b from the reference face 214c is set to be about 0.3 mm (in a range of 0.1 to 2 mm). When about 0.1 mm out of the height bites into the shaft 202, an effect of enhancing the creep resistance can be obtained.

The above described rolling bearing 203 can be used for various purposes, because it requires no other condition, except a condition that the step-like positioning face 209 is formed on the shaft 202 which is the press-fitted member. The above described rolling bearing 203 is particularly useful, on such occasion that it is necessary to reduce a wall thickness of the inner ring 205, and there is an anxiety that the life may be shortened, due to increase of the stress which occurs on the inner ring by increasing the clamping margin in case of a small wall thickness.

Figure 11:
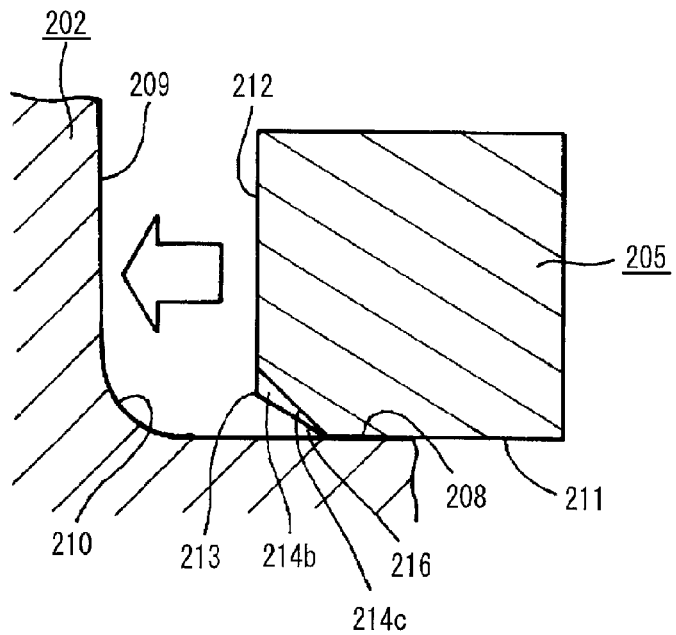
FIG. 11 is a longitudinal sectional view showing an essential part of a bearing device in a sixth embodiment according to the invention.

FIG. 11 shows a bearing device in a sixth embodiment according to the invention.

In FIG. 11, the corner part (the corner part of the raceway ring) 213 of the inner ring 205 is provided with a chamfered face 216. In this embodiment, the reference face 214c which is provided in the corner part 213 of the inner ring 205 has the same shape as that of the fifth embodiment. Because the chamfered face 216 is provided, a convex part 214d has such a shape that apart of the convex part 214b in the fifth embodiment is shaved off. An angle between the reference face 214c and the inner peripheral face 211 in this sixth embodiment is smaller than an angle between the chamfered face 216 and the inner peripheral face 211.

In the sixth embodiment, the chamfered face 216 may be formed after the convex part 214d has been formed, or the convex part 214d may be formed after the chamfered face 216 has been formed. It would be more preferable that the convex part 214d is formed after the chamfered face 216 has been formed, because the convex part 214d preferably has a pointed shape.

In this sixth embodiment, because the chambered face 216 is provided, press-fitting work can be easily conducted, in the press-fitting process as shown in FIGS. 10(a), 10(b) and 10(c).

Figure 12:
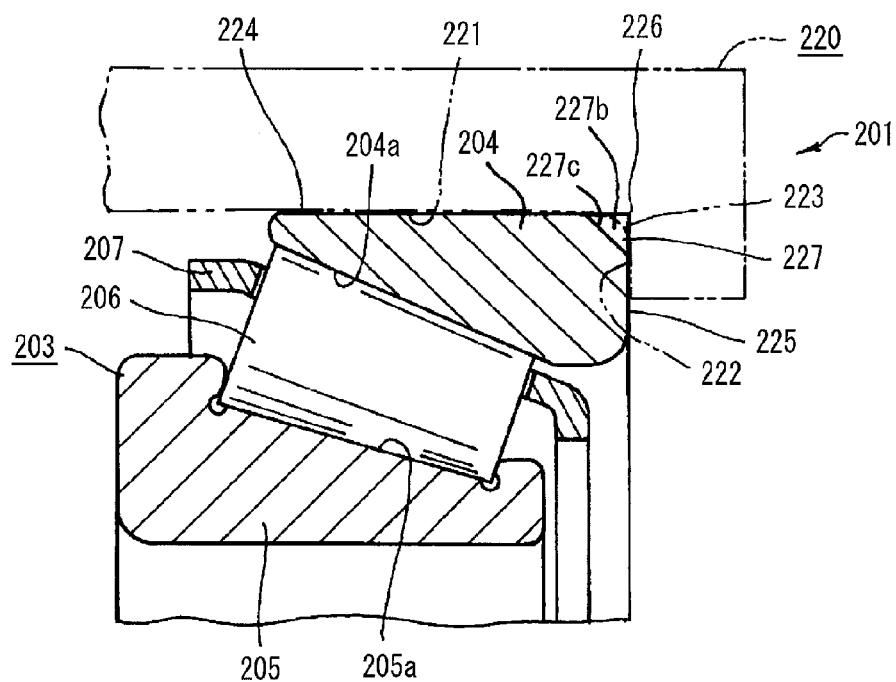
FIG. 12 is a longitudinal sectional view showing an upper half part of a bearing device in a seventh embodiment according to the invention.
Figure 13:
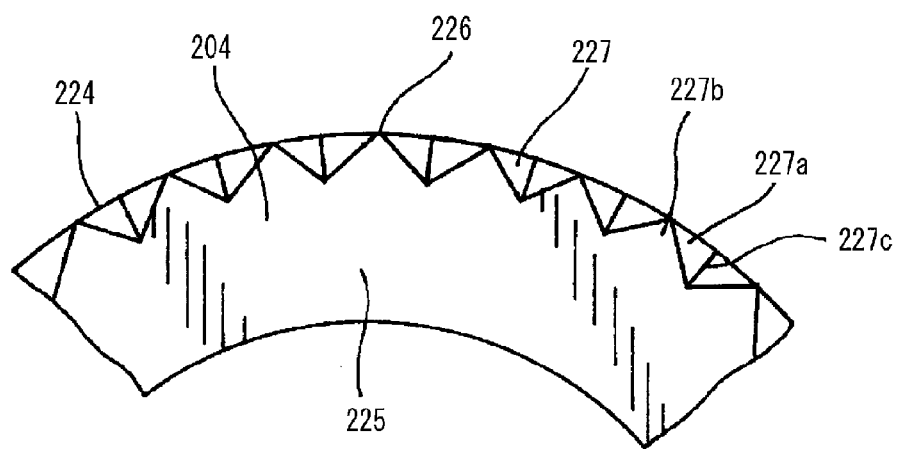
FIG. 13 is a front view of an outer ring which is an essential part in the seventh embodiment.
Figure 14:
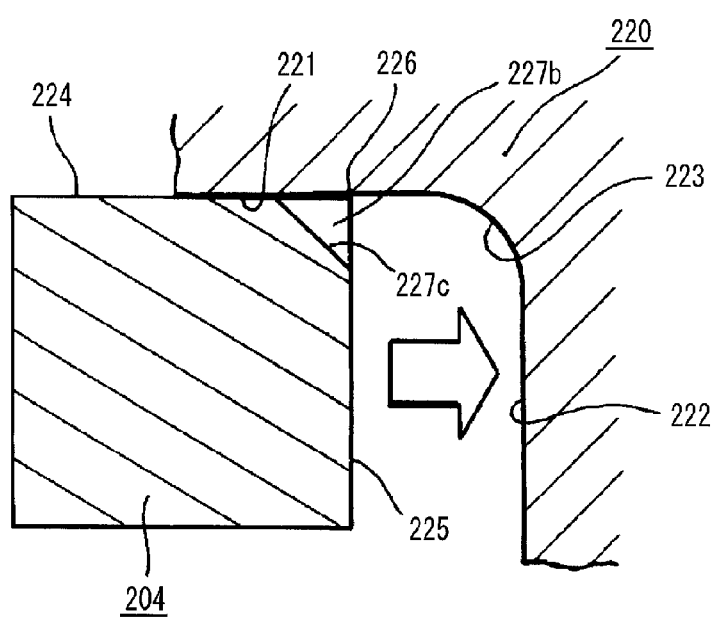
FIG. 14 is a longitudinal sectional view schematically showing press-fitting process between the housing and the outer ring.

FIGS. 12 to 14 show an example where a concavo-convex part 227 is provided in the corner part 226 of the outer ring 204 which is press-fitted to the housing 220, as a bearing device in a seventh embodiment according to the invention.

As shown in FIG. 12, the housing 220 has an inner peripheral face 221 which functions as a press-fitted face, a positioning face 222 in a step-like shape for regulating an axial position of the outer ring 204 which is press-fitted, and a corner part (a corner part of a press-fitted member) 223 which is formed between the inner peripheral face 221 and the positioning face 222. The positioning face 222 is formed by turning a part of the inner peripheral face 221 of the housing 220, and the corner part 223 is formed in a curved shape, following this turning work.

The outer ring (the raceway ring which is press-fitted) 204 of the rolling bearing 203 has an outer peripheral face (a press-fitting face) 224 which is press-fitted to the inner peripheral face (the press-fitted face) 221 of the housing 220, an end face (a butting face) 225 which is butted against the positioning face 222 of the housing 220, and a corner part (a corner part of the raceway ring) 226 which is formed between the outer peripheral face 224 and the end face 225. The corner part 226 is provided with a concavo-convex part 227.

As shown in FIG. 13, the concavo-convex part 227 is formed by repeating concave parts 227a and convex parts 227b each having a triangular shape, in a circumferential direction, and has a reference face 227c which is opposed to the corner part 223 of the housing 220 with a clearance.

According to this seventh embodiment, when the outer peripheral face 224 of the outer ring 204 is press-fitted to the inner peripheral face 221 of the housing 220, as shown in FIG. 14, the curve-shaped corner part 223 of the housing 220 interferes with the convex parts 227b which are provided in the corner part 226 of the outer ring 204. Therefore, by press-fitting the outer ring 204 until the end face 225 of the outer ring 204 comes into contact with the positioning face 222 of the housing 220, the convex part 227b bites into the corner part 223 of the housing 220. As the results, the outer ring 204 and the housing 220 are rigidly fitted to each other, thereby to prevent occurrence of a creep. When the convex part 227b bites into the corner part 223 of the housing 220, the corner part 223 of the housing 220 is swelled. However, the swelled part can be absorbed by the clearance (the concave part) 227a between the corner part 223 of the housing 220 and the reference face 227c of the outer ring 204, and the press-fitting work will not be hindered.

Therefore, according to the bearing device 201 in the seventh embodiment, the outer ring 204 is rigidly fitted to the housing 220 without increasing the clamping margin between the outer ring 204 and the housing 220. In this manner, it is possible to enhance the creep resistance without such anxiety that the outer ring 204 may be deformed. Assembling work can be performed by press-fitting in the same manner as in the prior art. Accordingly, additional working steps such as caulking are not required, and steps in assembling will not be increased. Therefore, it is possible to enhance the creep resistance while depressing an increase of the cost to the least.

The bearing device 201 in the seventh embodiment is used, for example, as the bearing device for a transmission in which the housing 220 is formed of aluminum alloy. In case where the housing 220 formed of aluminum alloy is combined with the outer ring 204 formed of bearing steel, it makes a condition that the creep is likely to occur. In this case, it is useful to provide the convex parts 227b in the corner part 226 of the outer ring 204. The housing 220 may be, of course, formed of steel, and in this case too, it is possible to obtain creep preventing effect in the same manner as described above.

In the above described fifth, sixth, and seventh embodiments, shapes of the convex parts 214b, 214d, 227b may be appropriately set. For example, they can be formed in a arc shape. It is more preferable that tip ends of the convex parts 214b, 214d, 227b are pointed. The number of the convex parts 214b, 214d, 227b has only to be at least three. It is also possible to provide a number of the convex parts 214b, 214d, 227b, by forming the convex parts 214b, 214d, 227b having the same shape continuously in the circumferential direction. Three (at an interval of 120° in the circumferential direction) or four (at an interval of 90° in the circumferential direction) convex parts 214b, 214d, 227b may be formed. Moreover, a plurality of the convex parts 214b, 214d, 227b may be arranged at a constant interval in the circumferential direction, or may be arranged irregularly in the circumferential direction.

Shapes of the corner part 210 of the shaft 202 and the corner part 223 of the housing 220 are not limited to the curved shape (an R shape), but may be formed as an inclined face.

Although not shown in the drawings, it is also possible to provide a concavo-convex part in the corner part 210 of the shaft 202, instead of providing the concavo-convex part 214 in the corner part 213 of the inner ring 205. Moreover, it is also possible to provide a concavo-convex part in the corner part 223 of the housing 203, instead of providing the concavo-convex part 227 in the corner part 226 of the outer ring 204. Specifically, the reference face (the opposed face) which is opposed to the corner part 213 of the inner ring 205 with a clearance may be provided in the corner part 210 of the shaft 202, and then, the convex part may be provided on this opposed face. Alternatively, the reference face (the opposed face) which is opposed to the corner part 226 of the outer ring 204 with a clearance may be provided in the corner part 223 of the housing 220, and then, the convex part may be provided on this opposed face. In order to determine on which of the corner parts the concavo-convex part is to be provided, it would be preferable to compare hardness of the two members, and to provide the concavo-convex part on the member having higher hardness.

Moreover, although the taper roller bearing has been described as an example in the above described embodiments, it is possible to apply the structure for enhancing the creep resistance not only to the taper roller bearing but also to a ball bearing, a cylinder roller bearing, and other bearing devices of various types.

This application is based on Japanese Patent Application (Application No. 2012-226534) filed on Oct. 12, 2012, and Japanese Patent Application (Application No. 2012-274303) filed on Dec. 17, 2012, the contents of which are hereby incorporated by reference.

INDUSTRIAL APPLICABILITY

According to the invention, it is possible to realize a bearing device which is enhanced in creep resistance, without increasing the number of steps in assembling.

DESCRIPTION OF THE REFERENCE NUMERALS AND SIGNS

101: Bearing device, 102: Shaft (inside member), 103: Housing (Outside member), 104: Outer ring, 105: Inner ring, 106: Taper roller (rolling element), 111, 112, 113, 114: Groove, 201: Bearing device, 202: Shaft (press-fitted member), 204: Outer ring (raceway ring), 205: Inner ring (raceway ring), 206: Taper roller (rolling element), 208: Outer peripheral face (press-fitted face), 209: Positioning face, 210: Corner part (corner part of press-fitted member), 211: Inner peripheral face (press-fitting face), 212: End face (butting face), 213: Corner part (corner part of raceway ring), 214b: Convex part, 214c: Reference face (opposed face), 214d: Convex part, 216: Chamfered face, 220: Housing (press-fitted member), 221: Inner peripheral face (press-fitted face), 222: Positioning face, 223: Corner part (corner part of press-fitted member), 224: Outer peripheral face (press-fitting face), 225: End face (butting face), 226: Corner part (corner part of raceway ring), 227b: Convex part, 227c: Reference face (opposed face)

The invention claimed is:

1. A bearing device including:
   an inner ring;
   an outer ring; and
   rolling elements arranged between the inner ring and the outer ring, the inner ring being assembled to an inside member by fitting, or the outer ring being assembled to an outside member by fitting, wherein:
   one of a fitting face of the inner ring which is fitted to the inside member, a fitting face of the inside member which is fitted to the inner ring, a fitting face of the outer ring which is fitted to the outside member, and a fitting face of the outside member which is fitted to the outer ring is formed with a plurality of grooves which are extended inwardly in an axial direction from an end of the fitting face and which are arranged in a circumferential direction; and
   the grooves are extended from both ends in an axial direction of the fitting face and closed in a middle part in the axial direction of the fitting face.

2. The bearing device according to claim 1, wherein the grooves have a trapezoidal shape in cross section.

3. The bearing device according to claim 1, wherein the grooves are extended in a direction inclined with respect to the axial direction of the fitting face.

4. A bearing device including: a rolling bearing that includes:
   an outer ring;
   an inner ring; and
   rolling elements which are arranged between the inner ring and the outer ring; and
   a press-fitted member to which a raceway ring that is one of the outer ring and the inner ring is fitted by press-fitting, the press-fitted member including:
   a press-fitted face to which the raceway ring is press-fitted;
   a positioning face in a step shape for regulating an axial position of the raceway ring; and
   a corner part of the press-fitted member which is formed between the press-fitted face and the positioning face, the raceway ring including:
   a press-fitting face which is press-fitted to the press-fitted face of the press-fitted member;
   a butting face which is butted against the positioning face of the press-fitted member; and
   a corner part of the raceway ring which is formed between the press-fitting face and the butting face, wherein:
   the corner part of the press-fitted member and the corner part of the raceway ring respectively have an opposed face of the press-fitted member and an opposed face of the raceway ring which are opposed to the other corner part with a clearance between them, and one of the opposed face of the press-fitted member and the opposed face of the raceway ring is provided with a plurality of convex parts biting into the other opposed face, in a circumferential direction.

5. The bearing device according to claim 4, wherein the convex parts are formed on one of the raceway ring and the press-fitted member which has higher hardness.

6. The bearing device according to claim 4, wherein the convex parts are formed on the raceway ring, the corner part of the press-fitted member is formed in a curved shape, the corner part of the raceway ring is chamfered, and the opposed face of the raceway ring is formed as an inclined face with respect to the press-fitting face and the butting face, and an angle formed between the inclined face and the press-fitting face is set to be smaller than an angle formed between a face formed by being chamfered and the press-fitting face.

7. The bearing device according to claim 4, wherein respective tip ends of the convex parts are pointed.

* * * * *